United States Patent
Wang et al.

(10) Patent No.: US 11,241,870 B2
(45) Date of Patent: Feb. 8, 2022

(54) MEMBRANE BEARING DEVICE AND MEMBRANE ATTACHING APPARATUS

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Longlong Wang, Beijing (CN); Peihuan Ning, Beijing (CN); Guangchao Wei, Beijing (CN); Haifeng Hu, Beijing (CN); Liuyue Yin, Beijing (CN); Liantao Wang, Beijing (CN); Weijie Ma, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 805 days.

(21) Appl. No.: 16/067,808

(22) PCT Filed: Dec. 11, 2017

(86) PCT No.: PCT/CN2017/115408
§ 371 (c)(1),
(2) Date: Jul. 2, 2018

(87) PCT Pub. No.: WO2018/223641
PCT Pub. Date: Dec. 13, 2018

(65) Prior Publication Data
US 2021/0162726 A1    Jun. 3, 2021

(30) Foreign Application Priority Data

Jun. 7, 2017 (CN) .......................... 201720653440.6

(51) Int. Cl.
*B32B 37/00* (2006.01)
*B29C 65/78* (2006.01)
*B32B 38/18* (2006.01)

(52) U.S. Cl.
CPC ...... *B32B 37/0053* (2013.01); *B29C 65/7802* (2013.01); *B32B 38/1858* (2013.01)

(58) Field of Classification Search
CPC ............ B32B 37/0053; B32B 38/1858; B65C 65/7802; B65C 65/7832; B65C 65/7835; B65C 65/7847
See application file for complete search history.

(56) References Cited

FOREIGN PATENT DOCUMENTS

| CN | 201298126 Y | 8/2009 |
|---|---|---|
| CN | 202244186 U | 5/2012 |

(Continued)

OTHER PUBLICATIONS

English translation of International Search Report and Written Opinion for corresponding PCT Application No. PCT/CN2017/115408, dated Feb. 26, 2018.

*Primary Examiner* — Philip C Tucker
*Assistant Examiner* — John Blades
(74) *Attorney, Agent, or Firm* — Kinney & Lange, P.A.

(57) ABSTRACT

A membrane bearing device, a membrane attaching apparatus and a method for attaching a membrane are provided in embodiments of the disclosure. The membrane bearing device includes: a base plate, comprising a first bearing surface configured to bear a membrane; and a roller, which is rotatably mounted onto the base plate, and is configured to transfer and attach the membrane from the first bearing surface to a substrate onto which the membrane is to be attached, by rolling on the membrane.

15 Claims, 3 Drawing Sheets

(56) References Cited

FOREIGN PATENT DOCUMENTS

| | | | |
|---|---|---|---|
| CN | 104724312 | A | 6/2015 |
| CN | 205770349 | U | 12/2016 |
| CN | 206202782 | U | 5/2017 |
| JP | 2010117546 | A | 5/2010 |
| JP | 2013022760 | A | 2/2013 |

MEMBRANE BEARING DEVICE AND MEMBRANE ATTACHING APPARATUS

CROSS-REFERENCE TO RELATED INVENTION

This application is a Section 371 National Stage Application of International Application No. PCT/CN2017/115408, filed on Dec. 11, 2017, entitled "MEMBRANE BEARING DEVICE AND MEMBRANE ATTACHING APPARATUS", which has not yet published, which claims priority to Chinese Patent Application Invention No. 201720653440.6 filed on Jun. 7, 2017 in the State Intellectual Property Office of China, the whole disclosure of which is incorporated herein by reference.

BACKGROUND OF THE DISCLOSURE

Field of the Disclosure

Embodiments of the present disclosure relate to the technical field of membrane attachment, and in particular, to a membrane bearing device and a membrane attaching apparatus.

Description of the Related Art

Mobile phone, computer, and the like play important roles in people's daily life. With a development of contemporary technologies, OGS (i.e., One Glass Solution) screen is widely applied in a technical field of touch technology due to its advantages such as light weight, high transmittance, simple manufacturing processes thereof and the like. In manufacturing processes of an OGS product, it is required to complete a plurality of membrane attaching processes for protecting the OGS product and avoiding any disadvantages such as surface scratching, contamination and the like during the manufacturing processes.

At current stage, the operations of membrane attaching for the OGS product are mainly implemented on an automatic membrane-attaching apparatus; however, as to repaired defective product, a manual operation for attaching membrane is still required to be implemented thereon, or a semi-automatic membrane attaching apparatus is used.

SUMMARY OF THE DISCLOSURE

The embodiments of the present disclosure have been made to overcome or alleviate at least one aspect of the above mentioned disadvantages and/or shortcomings in the prior art, by providing a membrane bearing device and a membrane attaching apparatus.

According to an aspect of the exemplary embodiment of the present disclosure, there is provided a membrane bearing device, comprising:

a base plate, comprising a first bearing surface configured to bear a membrane; and a roller, which is rotatably mounted onto the base plate, and is configured to transfer and attach the membrane from the first bearing surface to a substrate onto which the membrane is to be attached, by rolling on the membrane.

According to an embodiment of the disclosure, the roller is provided on a side surface of the base plate adjacent to the first bearing surface.

According to an embodiment of the disclosure, a swinger which functions as a first positioner is provided on the base plate and is swayable to one of a first position and a second position, relative to the base plate; the swinger is provided with a first positioning surface, and in response to the swinger being swayed to the first position, the first positioning surface is aligned with an attachment starting end of the membrane so as to define a specific position of the membrane on the first bearing surface; and in response to the swinger being located at the second position, the swinger is located away from the attachment starting end of the membrane.

According to an embodiment of the disclosure, in response to the swinger being swayed to the first position, the first positioning surface is perpendicular to the first bearing surface.

According to an embodiment of the disclosure, the swinger comprises a first supporting pillar, a second supporting pillar and a positioning plate; a first end of the first supporting pillar and a first end of the second supporting pillar are provided respectively on two side surfaces of the base plate which side surfaces are adjacent to the first bearing surface and opposite to each other, and the first supporting pillar and the second supporting pillar are swayable relative to the base plate; and the positioning plate is connected between a second end of the first supporting pillar and a second end of the second supporting pillar, the second end of the first supporting pillar being opposite to the first end of the first supporting pillar while the second end of the second supporting pillar being opposite to the first end of the second supporting pillar, and the positioning plate is driven by both the first pillar and the second pillar to sway to the first position at which the positioning plate is in contact with the roller.

According to an embodiment of the disclosure, the base plate is provided with a vacuum adsorption device for adsorbing the membrane onto the first bearing plate.

According to an embodiment of the disclosure, a handle is provided at a surface of the base plate facing away from the first bearing surface for holding the base plate by hand.

According to another aspect of the exemplary embodiment of the present disclosure, there is provided a membrane attaching apparatus, comprising a base table, the base table comprising a second bearing surface for supporting the substrate onto which the membrane is to be attached; the membrane attaching apparatus further comprises the membrane bearing device as above, the membrane bearing device is used for attaching the membrane to the substrate onto which the membrane is to be attached on the base table; and the base plate is movable relative to the base table for supporting the substrate onto which the membrane is to be attached and used to bear the membrane in a removable manner, and the roller is used to roll on the membrane in response to the base plate being moved relative to the base table.

According to an embodiment of the disclosure, the membrane attaching apparatus further comprises a base plate positioner on the base table for defining a position of the roller and in turn aligning the attachment starting end of the membrane with an attachment starting end of the substrate onto which the membrane is to be attached.

According to an embodiment of the disclosure, the base plate positioner comprises a first stop on the base table, and the first stop comprises a second positioning surface used to align the attachment starting end of the membrane with the attachment starting end of the substrate onto which the membrane is to be attached in response to the roller being in touch with the second positioning surface.

According to an embodiment of the disclosure, the second positioning surface is perpendicular to the second bearing surface.

According to an embodiment of the disclosure, the base plate positioner further comprises an adjusting screw and a mounting plate for mounting the adjusting screw thereon; and the mounting plate is provided on the base table and located at a side of the first stop facing away from the second positioning surface, and the mounting plate is provided with a screw hole whose axis is perpendicular to the second positioning surface; and the adjusting screw passes through and is in a threaded connection with the screw hole, and is rotatably connected with the first stop which is movable relative to the base table.

According to an embodiment of the disclosure, the base table is further provided with a second stop which has a third positioning surface and a fourth positioning surface, the third positioning surface and the fourth positioning surface being aligned with the attachment starting end of the substrate onto which the membrane is to be attached and a side thereof adjacent to the attachment starting end of the substrate respectively so as to define a position of the substrate onto which the membrane is to be attached on the second bearing surface.

According to an embodiment of the disclosure, the third positioning surface and the fourth positioning surface are perpendicular to each other and both are perpendicular to the second bearing surface.

According to an embodiment of the disclosure, the base table is further provided with a third stop which has a fifth positioning surface, and the base plate is provided with a positioning pillar; and in response to the base plate being moved relative to the base table, the positioning pillar moves along the fifth positioning surface and in turn defines a direction in which the base plate moves.

According to an embodiment of the disclosure, the positioning pillar is provided with a rolling device which rolls along the fifth positioning surface in response to the base plate being moved relative to the base table.

According to yet another aspect of the exemplary embodiment of the present disclosure, there is provided a method for attaching a membrane, comprising:

placing a membrane on a base plate within a membrane attaching apparatus;

driving a rotation of a roller which is rotatably mounted on the base plate, by moving the base plate relative to a base table of the membrane attaching apparatus; and transferring and attaching the membrane to a substrate onto which the membrane is to be attached, by rolling on the membrane by taking advantage of the rotation of the roller, the substrate onto which the membrane is to be attached being supported on the base table of the membrane attaching apparatus.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF PREFERRED EMBODIMENTS OF THE DISCLOSURE

Figure 1:
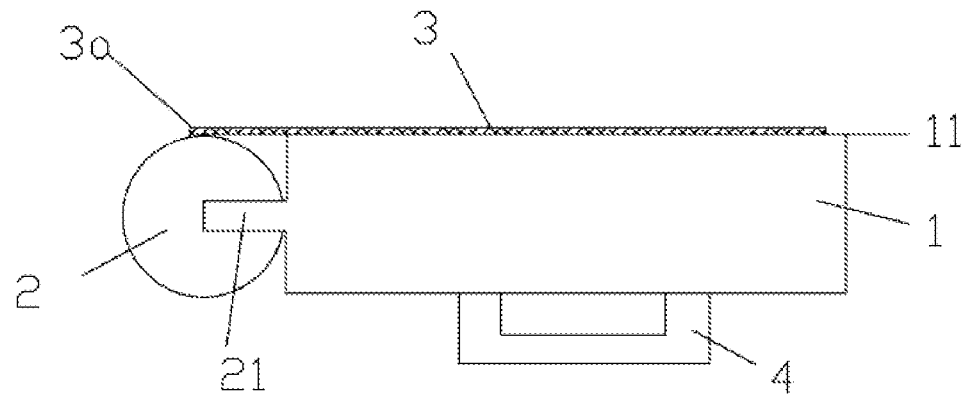
FIG. 1 illustrates a structural schematic view of a membrane bearing device according to embodiments of the disclosure.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of a membrane bearing device and a membrane attaching apparatus.

In order to ensure that technical solutions of the embodiments of the disclosure may be understood readily and better by those skilled in the art, the membrane bearing device and the membrane attaching apparatus according to embodiments of the disclosure may be described in detail hereinafter by referring to the drawings.

Figure 4:
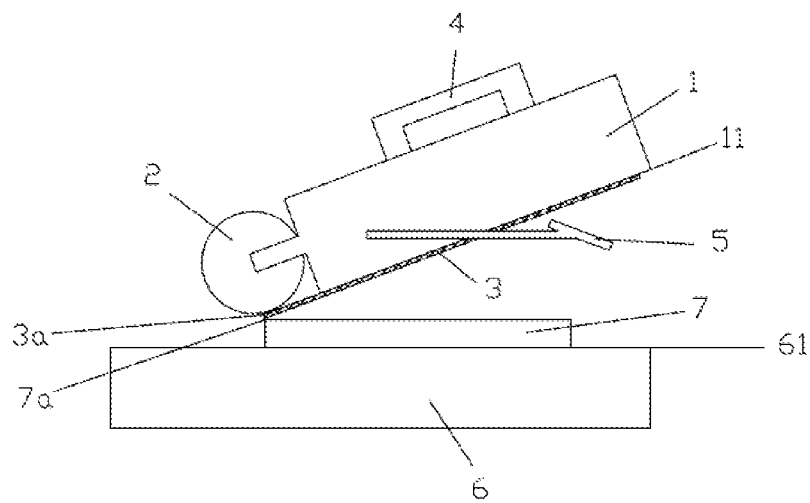
FIG. 4 illustrates a reference status diagram of the membrane bearing device in use according to an embodiment of the disclosure.

As illustrated in FIG. 1, and in view of the reference status diagram of a usage state of FIG. 4, according to a general technical concept of the present disclosure, there is provided a membrane bearing device comprising a base plate 1, the base plate 1 comprising a first bearing surface 11 configured to bear a membrane 3. The first bearing surface 11 may for example function by electrostatic adsorption or by air adsorption, and is provided at a side thereof with a roller 2 which is for example rotatably mounted onto the base plate 1, e.g., via a mounting base (e.g., a convex portion 21 which projects outwards from an end of the base plate 1), and the roller 2 is configured to be rotatable around the convex portion 21. For example, the roller is provided on a side surface of the base plate adjacent to the first bearing surface.

When a membrane attaching operation is being implemented by above membrane bearing device, above all, a rolling peripheral surface of the roller 2 is disposed to be in contact with an attachment starting end 3a of the membrane 3 which is placed on the first bearing surface 11; and then, the base plate 1 is moved relative to a base table, and during this process, the roller 2 may rotate so as to transfer the membrane 3 from the first bearing surface 11 to get into contact with a substrate onto which the membrane is to be attached, and in turn to attach the membrane 3 onto the substrate onto which the membrane is to be attached, by rolling on the membrane 3. As such, the membrane attaching operation is completed. It should be readily understood that, above roller 2 should rotate within a plane perpendicular to the first bearing surface 11. In addition, the base plate 1 may for example be held by hand such that it moves relative to the base table.

A tangent plane at a contact point or a contact line of the roller 2 with the attachment starting end 3a of the membrane 3 is aligned with and flushes with the first bearing surface 11, such that the membrane 3 is in a flat and smooth condition; in other words, the membrane 3 is in a condition of a flat and smooth surface when it is placed on both the first bearing surface 11 and the roller 2 simultaneously.

Figure 2:
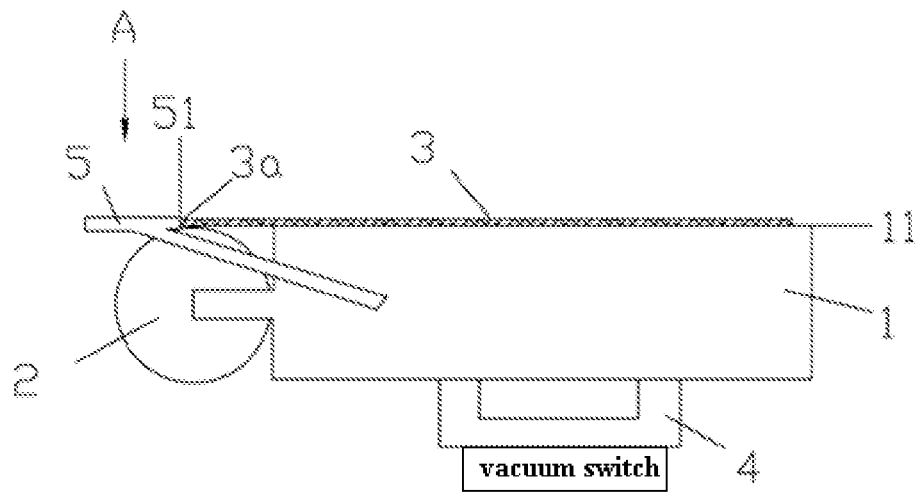
FIG. 2 illustrates a schematic structural view of a membrane bearing device according to an exemplary embodiment of the disclosure.
Figure 3:
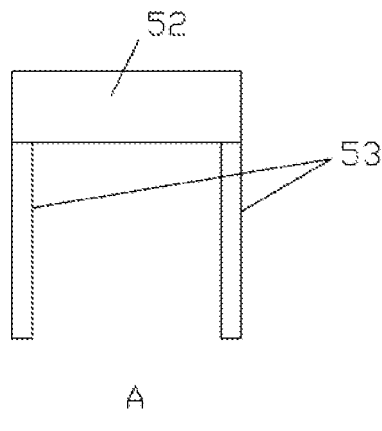
FIG. 3 illustrates a schematic structural view of a swinger viewed in a direction A as illustrated in FIG. 2.

Also referring to FIG. 2 to FIG. 4, a swinger 5 which functions as a first positioner 5 is provided on the base plate 1 and is swayable to a first position as illustrated in FIG. 2 or a second position as illustrated in FIG. 4, relative to the base plate 1. Moreover, the swinger 5 is provided with a first positioning surface 51, and in response to the swinger 5 being swayed to the first position, the first positioning surface 51 is adjacent to or abuts against an end of the first bearing surface at a side to which the swinger 5 is swayed, and the first positioning surface 51 is perpendicular to the first bearing surface 11 at that first position, so as to define a specific position of the membrane 3 on the first bearing surface 11 by aligning the attachment starting end 3a of the membrane 3 with the first positioning surface 51, and in turn to assist in implementing a contact of the attachment starting end 3a of the membrane with the roller. In addition, in response to the swinger 5 being located at the second position, the swinger 5 is located away from the attachment starting end 3a of the membrane 3, so as to avoid any interference for a membrane attaching action.

Specifically, as illustrated in FIG. 3, the swinger 5comprises two supporting pillars, i.e., a first supporting pillar 53, a second supporting pillar 53, and a positioning plate 52, and a first end of the first supporting pillar 53 and a first end of the second supporting pillar are provided respectively on (e.g., pivotably mounted onto) two side surfaces of the base plate 1 adjacent to the first bearing surface and opposite to each other. FIG. 2 illustrates one side surface on which a respective one supporting pillar 53 is located, and the supporting pillars 53 are swayable relative to the base plate 1. The positioning plate 52 is connected between another ends of the two supporting pillars 53, i.e., between a second end of the first supporting pillar and a second end of the second supporting pillar. And the positioning plate 52 is driven by both the first pillar and the second pillar 53 to sway (in a clockwise direction) to arrive at a position at which the positioning plate 52 is in contact with the roller 2 and thus fails to proceed to sway, then, that position is aforementioned first position; i.e., the roller defines the first position of the positioning plate 52.

It should be noticed that, before the membrane attaching operation, it is required that the positioning plate 52 sways anticlockwise/reversely to the position as illustrated in FIG. 4, i.e., the positioning plate 52 sways to aforementioned second position so as to avoid any interference for the membrane attaching action. The second position is not merely limited to the position as illustrated in FIG. 4, as long as the positioning plate 52 may not interfere with the membrane attaching action.

Figure 5:
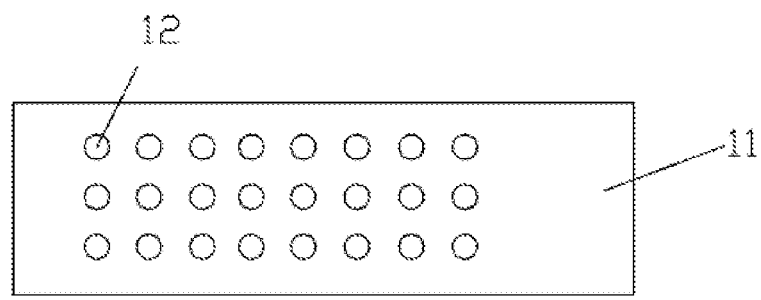
FIG. 5 illustrates schematic structural view of a vacuum adsorption device.

In an embodiment, for example, the base plate 1 is provided with a vacuum adsorption device 12 for adsorbing the membrane 3 onto the first bearing plate 11. Specifically, as illustrated in FIG. 5, the vacuum adsorption device 12 comprises a plurality of adsorption holes distributed on the first bearing surface 11, and a vacuum evacuation mechanism. By using the vacuum evacuation mechanism to evacuate or pump out air between the first bearing surface 11 and the membrane 3 through the adsorption holes, the membrane is secured removably.

In addition, according to an embodiment of the disclosure, a handle 4 is provided at a surface of the base plate 1 facing away from the first bearing surface 11 for holding the base plate 1 by hand. According to a further embodiment of the disclosure, e.g., a vacuum switch is provided on the handle 4 for controlling the opening/closing of the vacuum adsorption device. Before placing the membrane 3 onto the first bearing surface 11, the vacuum switch is switched on. Once the membrane attaching operation is completed, the vacuum switch is switched off.

As illustrated in FIG. 4, specific processes of the membrane attaching operation are as follows. Above all, the base plate 1 is held by hand, and is pressed against the substrate 7 onto which the membrane is to be attached on the base table 6 by the roller 2, and the attachment starting end 3a of the membrane 3 is aligned with the attachment starting end 7a of the substrate 7 onto which the membrane is to be attached. Then, the base plate 1 is held by hand to move relative to the base table 6; and since there exists a frictional resistance between the membrane 3 and the substrate 7 onto which the membrane is to be attached, the membrane 3 may be transferred to a surface of the substrate 7 onto which the membrane is to be attached from the first bearing surface 11 of the base plate 1 through a surface of the roller 2, and in turn be rolled on by the roller 2 to attach to the substrate 7 onto which the membrane is to be attached, during a rolling process of the roller 2, i.e., the membrane attachment operation for the membrane 3 is completed.

In technical solutions of the membrane bearing device according to embodiments of the disclosure, there are the advantageous technical effects as follows: by moving the base plate relative to the base table, the membrane may be attached to the substrate onto which the membrane is to be attached by being rolled on the membrane by the roller, so as to complete a task for attaching the membrane. Thereby, with above membrane bearing device, the operating personnel may be assisted in the membrane attaching operation, resulting in a higher accuracy in membrane attaching and a faster operational speed as compared with a purely manual operation for attaching membrane. Moreover, above membrane bearing device further has advantages such as simple structure, user-friendly operation, low manufacturing cost, without any requirement in training the operating personnel and without any debugging for the membrane attaching apparatus; and the membrane attaching operation may be completed even in case of warping or unevenness of the substrate 3 onto which the membrane is to be attached.

Figure 6:
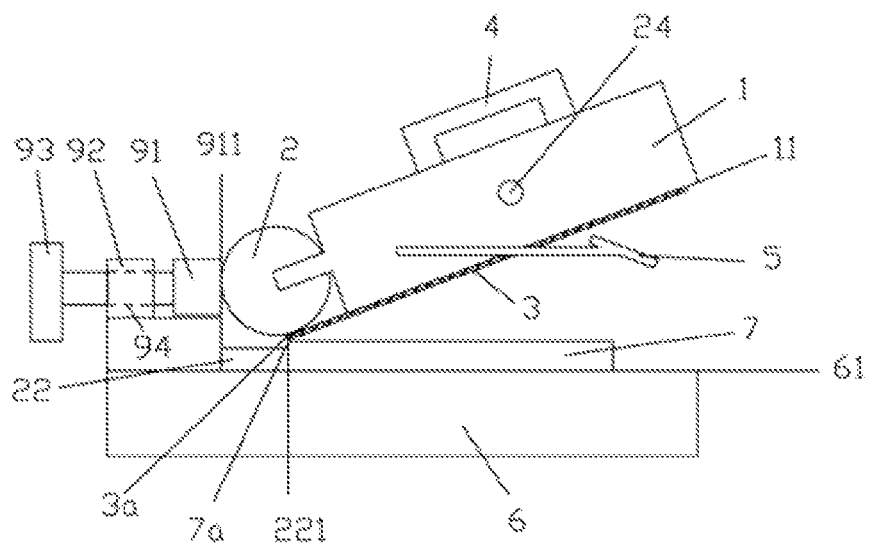
FIG. 6 illustrates schematic structural view of a membrane attaching apparatus according to an embodiment of the disclosure.

As another technical solution, a membrane attaching apparatus is provided in an embodiment of the disclosure. As illustrated in FIG. 6, the membrane attaching apparatus comprises a base table 6 and aforementioned membrane bearing device provided by above embodiments of the disclosure, the base plate 1 of the membrane bearing device is configured to move relative to the base table 6 for bearing the substrate 7 onto which the membrane is to be attached so as to load the membrane 3 in a removable manner onto the substrate 7 onto which the membrane is to be attached, and the roller is used to roll on the membrane in response to the base plate being moved relative to the base table. The base table 6 comprises a second bearing surface 61 for bearing the substrate 7 onto which the membrane is to be attached. Aforementioned membrane bearing device according to above embodiments of the disclosure is used to attach the membrane 3 onto the substrate 7 onto which the membrane is to be attached on the base table 6.

Figure 7:
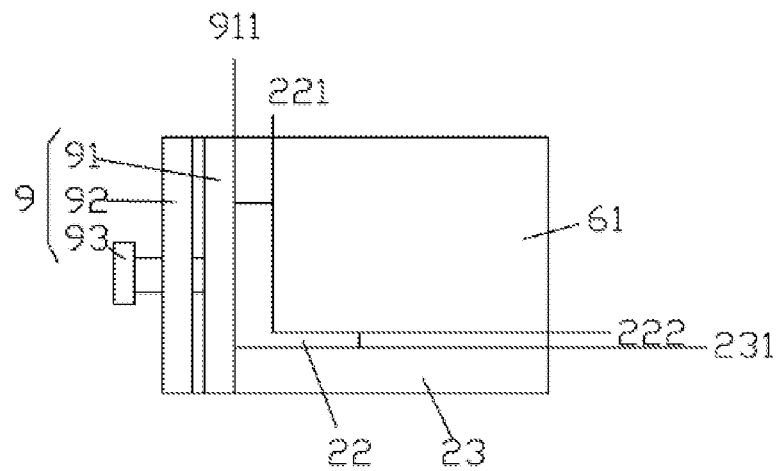
FIG. 7 illustrates schematic structural top view of a base table according to an embodiment of the disclosure.

In order to further enhance accuracy in membrane attaching, the membrane attaching apparatus further comprises a base plate positioner provided on the base table 6 for defining a position of the roller 2 and in turn aligning the attachment starting end 3a of the membrane 3 with an attachment starting end 7a of the substrate 7 onto which the membrane is to be attached. Specifically, as illustrated in FIG. 6 and FIG. 7, the base plate positioner comprises a first stop 91 which functions as a second positioner on the base table 6, and the first stop 91 comprises a second positioning surface 911. The second positioning surface 911 is located at a side opposite to the second bearing surface 61 and is for example perpendicular to the second bearing surface 61 and may be used to align (e.g., automatically) the attachment starting end 3a of the membrane 3 with the attachment starting end 7a of the substrate 7 onto which the membrane is to be attached in response to the roller 2 being in touch with the second positioning surface 911.

Furthermore, the base plate positioner further comprises a mechanism for adjusting specific positioning of the first stop 91 so as to implement an adjustment on the position of the second positioning surface 911. Specifically, such a mechanism comprises an adjusting screw 93 and a mounting plate 92 for mounting the adjusting screw thereon, and the mounting plate 92 is provided on the base table 6 and located at a side of the first stop 91 facing away from the second positioning surface 911, and the mounting plate 92 is provided with a screw hole 94 whose axis is perpendicular to the second positioning surface 911. And the adjusting screw 93 passes through and is in a threaded connection with the screw hole. Moreover, the adjusting screw 93 is rotatably connected with the first stop 91, and the first stop 91 is movable relative to the base table 6.

By rotating the adjusting screw 93 clockwise or anticlockwise, the adjustment screw 93 may cooperate with above screw hole so as to move towards or away from the second positioning surface 911, e.g., in a direction parallel to the second bearing surface 61 and in turn to drive the first stop 91 to move synchronously, so as to implement an adjustment on positioning of the second positioning surface 911, i.e., the second positioning surface 911 is moved to approach or away from the second bearing surface 61.

Furthermore, on the base table 6, there may be provided with a guiding device, such as a guide rail, a guide pillar, or the like, for guiding the direction in which the first stop 91 is moved in response to the movement of the first stop 91.

As illustrated in the top view of FIG. 7, according to an embodiment of the disclosure, the base table 6 is further provided with a second stop 22 which acts as a third positioner and has a third positioning surface 221 and a fourth positioning surface 222, the third positioning surface and the fourth positioning surface for example being perpendicular to each other and both perpendicular to the second bearing surface 61, and being used to align with the attachment starting end 7a of the substrate 7 onto which the membrane is to be attached and with a side of the substrate 7 onto which the membrane is to be attached adjacent to the attachment starting end 7a, respectively, so as to define the position of the substrate 7 onto which the membrane is to be attached on the second bearing surface 61.

Figure 8:
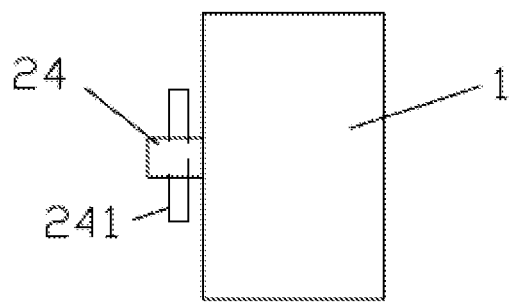
FIG. 8 illustrates schematic structural view of a positioning pillar.

As also illustrated in FIG. 6 to FIG. 8, the base table 6 is further provided with a third stop 23 which functions as a fourth positioner and has a fifth positioning surface 231, and correspondingly, the side surface of the base plate is provided with a positioning pillar 24; as illustrated in FIG. 8, the positioning pillar 24 projects relative to a respective side surface of the base plate 1. In response to the base plate 1 being moved to the base table 6, the positioning pillar 24 is aligned with and moves synchronously along the fifth positioning surface 231 so as to define a direction in which the base plate 1 moves and in turn to avoid any offset of the membrane 3.

Furthermore, in order to decrease a frictional force between the positioning pillar 24 and the fifth positioning surface 231, the positioning pillar 24 is provided with a rolling device 241 which rolls along the fifth positioning surface 231 in response to the base plate 1 being moved relative to the base table 6. The rolling device 241 for example comprises a roller 241 which is for example rollable on the fifth positioning surface 231.

As still another technical solution, there is further provided method for attaching a membrane, comprising following steps:

placing a membrane on a base plate 1 within the membrane attaching apparatus as above;

driving a rotation of a roller 2 which is rotatably mounted on the base plate 1, by moving the base plate 1 relative to a base table 6 of the membrane attaching apparatus; and transferring and attaching the membrane to a substrate 7 onto which the membrane is to be attached, by rolling on the membrane by taking advantage of the rotation of the roller 2, the substrate 7 onto which the membrane is to be attached being supported on the base table 6 of the membrane attaching apparatus.

In conclusion, the membrane attaching apparatus, and the method for attaching a membrane, both according to the embodiment of the disclosure, utilizes aforementioned membrane bearing device according to aforementioned embodiments of the disclosure, and thus possesses the advantages of the membrane bearing device as follows: by moving the base plate relative to the base table, the membrane may be attached to the substrate onto which the membrane is to be attached by being rolled on the membrane by the roller, so as to complete a task for attaching the membrane. Thereby, with above membrane bearing device, the operating personnel may be assisted in the membrane attaching operation, resulting in a higher accuracy in membrane attaching and a faster operational speed as compared with a purely manual operation for attaching membrane. Moreover, above membrane bearing device further has advantages such as simple structure, user-friendly operation, low manufacturing cost, without any requirement in training the operating personnel and without any debugging for the membrane attaching apparatus; and the membrane attaching operation may be completed even in case of warping or unevenness of the substrate 3 onto which the membrane is to be attached.

It should be appreciated for those skilled in this art that the above embodiments are only exemplary embodiments intended to illustrate the operation principle of the disclosure, rather than being limited thereto. As to those skilled in the art, various variations and/or modifications may be made in these embodiments, without departing from the principles and spirit of the disclosure, and these variations and/or modifications still lie within the scope of present application.

What is claimed is:

1. A membrane bearing device, comprising:
a base plate, comprising a first bearing surface configured to bear a membrane; and
a roller, which is rotatably mounted onto the base plate, and is configured to transfer and attach the membrane from the first bearing surface to a substrate onto which the membrane is to be attached, by rolling on the membrane,
wherein a swinger configured to function as a first positioner is provided on the base plate and is swayable to one of a first position and a second position, relative to the base plate;
wherein the swinger is provided with a first positioning surface, and in response to the swinger being swayed to the first position, the first positioning surface is aligned with an attachment starting end of the membrane so as to define a specific position of the membrane on the first bearing surface; and
wherein in response to the swinger being located at the second position, the swinger is located away from the attachment starting end of the membrane.

2. The membrane bearing device according to claim 1, wherein the roller is provided on a side surface of the base plate adjacent to the first bearing surface.

3. The membrane bearing device according to claim 1, wherein in response to the swinger being swayed to the first position, the first positioning surface is perpendicular to the first bearing surface.

4. The membrane bearing device according to claim 1, wherein the swinger comprises a first supporting pillar, a second supporting pillar and a positioning plate;
wherein a first end of the first supporting pillar and a first end of the second supporting pillar are provided respectively on two side surfaces of the base plate which side surfaces are adjacent to the first bearing surface and opposite to each other, and the first supporting pillar and the second supporting pillar are swayable relative to the base plate; and
wherein the positioning plate is connected between a second end of the first supporting pillar and a second end of the second supporting pillar, the second end of the first supporting pillar being opposite to the first end of the first supporting pillar and the second end of the second supporting pillar being opposite to the first end of the second supporting pillar, and the positioning plate is driven by both the first pillar and the second pillar to sway to the first position at which the positioning plate is in contact with the roller.

5. The membrane bearing device according to claim 1, wherein the base plate is provided with a vacuum adsorption device for adsorbing the membrane onto the first bearing surface.

6. The membrane bearing device according to claim 1, wherein a handle is provided at a surface of the base plate facing away from the first bearing surface for holding the base plate by hand.

7. A membrane attaching apparatus comprising the membrane bearing device according to claim 1, and further comprising a base table, the base table comprising a second bearing surface for supporting the substrate onto which the membrane is to be attached,
wherein the base plate is movable relative to the base table for supporting the substrate onto which the membrane is to be attached and used to bear the membrane in a removable manner, and the roller is used to roll on the membrane to attach the membrane onto the substrate onto which the membrane is to be attached on the base table in response to the base plate being moved relative to the base table.

8. The membrane attaching apparatus according to claim 7, further comprising a base plate positioner on the base table for defining a position of the roller and in turn aligning the attachment starting end of the membrane with an attachment starting end of the substrate onto which the membrane is to be attached.

9. The membrane attaching apparatus according to claim 8, wherein the base plate positioner comprises a first stop on the base table, and the first stop comprises a second positioning surface used to align the attachment starting end of the membrane with the attachment starting end of the substrate onto which the membrane is to be attached in response to the roller being in touch with the second positioning surface.

10. The membrane attaching apparatus according to claim 9, wherein the second positioning surface is perpendicular to the second bearing surface.

11. The membrane attaching apparatus according to claim 9, wherein the base plate positioner further comprises an adjusting screw and a mounting plate for mounting the adjusting screw thereon;
wherein the mounting plate is provided on the base table and located at a side of the first stop facing away from the second positioning surface, and the mounting plate is provided with a screw hole whose axis is perpendicular to the second positioning surface; and
wherein the adjusting screw passes through and is in a threaded connection with the screw hole, and is rotatably connected with the first stop which is movable relative to the base table.

12. The membrane attaching apparatus according to claim 7, wherein the base table is further provided with a second stop which has a third positioning surface and a fourth positioning surface, the third positioning surface and the fourth positioning surface being aligned with the attachment starting end of the substrate onto which the membrane is to be attached and a side thereof adjacent to the attachment starting end of the substrate respectively so as to define a position of the substrate onto which the membrane is to be attached on the second bearing surface.

13. The membrane attaching apparatus according to claim 12, wherein the third positioning surface and the fourth positioning surface are perpendicular to each other and both are perpendicular to the second bearing surface.

14. The membrane attaching apparatus according to claim 7, wherein the base table is further provided with a third stop which has a fifth positioning surface, and the base plate is provided with a positioning pillar; and
wherein in response to the base plate being moved relative to the base table, the positioning pillar moves along the fifth positioning surface and in turn defines a direction in which the base plate moves.

15. The membrane attaching apparatus according to claim 14, wherein the positioning pillar is provided with a rolling device which rolls along the fifth positioning surface in response to the base plate being moved relative to the base table.

* * * * *